(12) United States Patent
Yeh

(10) Patent No.: US 7,612,924 B2
(45) Date of Patent: Nov. 3, 2009

(54) CARRIAGE MODULE WITH IMAGE CAPTURE UNIT

(75) Inventor: Harnjou Yeh, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 603 days.

(21) Appl. No.: 11/269,526

(22) Filed: Nov. 9, 2005

(65) Prior Publication Data

US 2007/0103736 A1 May 10, 2007

(51) Int. Cl.
*H04N 1/04* (2006.01)
(52) U.S. Cl. .................... 358/474; 235/454; 358/1.5
(58) Field of Classification Search ............... 358/487, 358/474, 493; 235/454
See application file for complete search history.

(56) References Cited

U.S. PATENT DOCUMENTS

| 5,537,219 | A | * | 7/1996 | Morikawa et al. | 358/406 |
| 5,537,225 | A | * | 7/1996 | Morikawa et al. | 358/475 |
| 6,424,433 | B1 | * | 7/2002 | Miyauchi et al. | 358/471 |
| 7,170,649 | B2 | * | 1/2007 | Chang | 358/474 |
| 7,235,769 | B2 | * | 6/2007 | Uemura | 250/208.1 |
| 7,352,498 | B2 | * | 4/2008 | Harris | 358/497 |
| 7,405,849 | B2 | * | 7/2008 | Chen | 358/493 |
| 2006/0278707 | A1 | * | 12/2006 | Wang et al. | 235/454 |

* cited by examiner

*Primary Examiner*—Twyler L Haskins
*Assistant Examiner*—David L Suazo
(74) *Attorney, Agent, or Firm*—Rosenberg, Klein & Lee

(57) ABSTRACT

A carriage module with an image capture unit for using in a scanning device is disclosed. The module includes a carriage having a sliding seat and a cam; a lens attached to the carriage device; an image capture unit capturing the light images from the lens; a PC board mounting the carriage; and a supporting plate supporting the PC board. The supporting plate includes a pin and formed on the carriage. The simple trimming mechanism adjusts the distance between the lens and the image sensor easily. So, the device not only improves the quality of the formation of image and also promotes the efficiency of operating.

6 Claims, 3 Drawing Sheets

CARRIAGE MODULE WITH IMAGE CAPTURE UNIT

BACKGROUND OF THE INVENTION

1. Field of the Invention

The present invention relates to a carriage module with an image capture unit, more particularly relates to a carriage module with an image capture unit that uses a simple trimming mechanism to adjust the distance between the lens and the image sensor.

2. Description of the Prior Art

With the advent of the digital age, digital camera and scanner have made their ways into a wide variety of applications, ranging from mini, portable products to medium- and large-size equipment. Scanners have become the mainstream of the market and have already become a part of modern life.

One of the most important components of the photoelectric equipment is a carriage module with an image capture unit. According to different kinds of the demand, the grasping device for specially things, such as film, slide, etc., or the light source of different wavelength such as infrared ray (IR), etc., because of the physics limitation of formation the image of optics, the best position of lens to form the image is not the same to every application. It is unable to focus and to get the best quality of digital image for putting the film-grasping device on the glass platform of the scanner or using the infrared ray as the light source.

In the past it was commonly moving the lens or the object (such as film, slide, etc.) to adjust the focus. But, using this way to adjust the focus not only unable to capture the best quality of the digital image, and this focus is unable to reproduce.

Therefore, there exists a need in the art for propose a kind of image capture unit to take the best quality of image.

SUMMARY OF THE INVENTION

The present invention addresses the problem discussed above, and an object of the present invention to provide a simple trimming mechanism for adjusting the distance between the lens and the image sensor, which improves the best quality of image.

To achieve the above object, one embodiment of the present invention introduces a carriage module with an image capture unit which includes a carriage having a sliding seat and a cam; a lens attached to the carriage device; an image capture unit which captures light images from the lens; a PC board on which the carriage are formed; and a supporting plate which supports the PC board, the supporting plate including a pin and formed on the carriage with the pin; thereby the cam moving and the pin following in the special direction, automatically adjusting the distance between the lens and the image sensor.

It is necessary for image-capturing device, one of the most important components for optic equipment, to be associated with light source with various wavelength light, such as IR ray, in order to meet various applications, such as specific grasping device for film, slide, etc. Because of physical limitation of formation the image of optics, the best position of lens to form the image is not the same to every application. It is unable to focus and to get the best quality of digital image for putting the film-grasping device on the glass platform of the scanner or using the infrared ray as the light source.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

The present invention will be more fully understood from the detailed description, which will be given hereinafter, with the aid of the illustrations below.

DESCRIPTION OF THE PREFERRED

Figure 1:
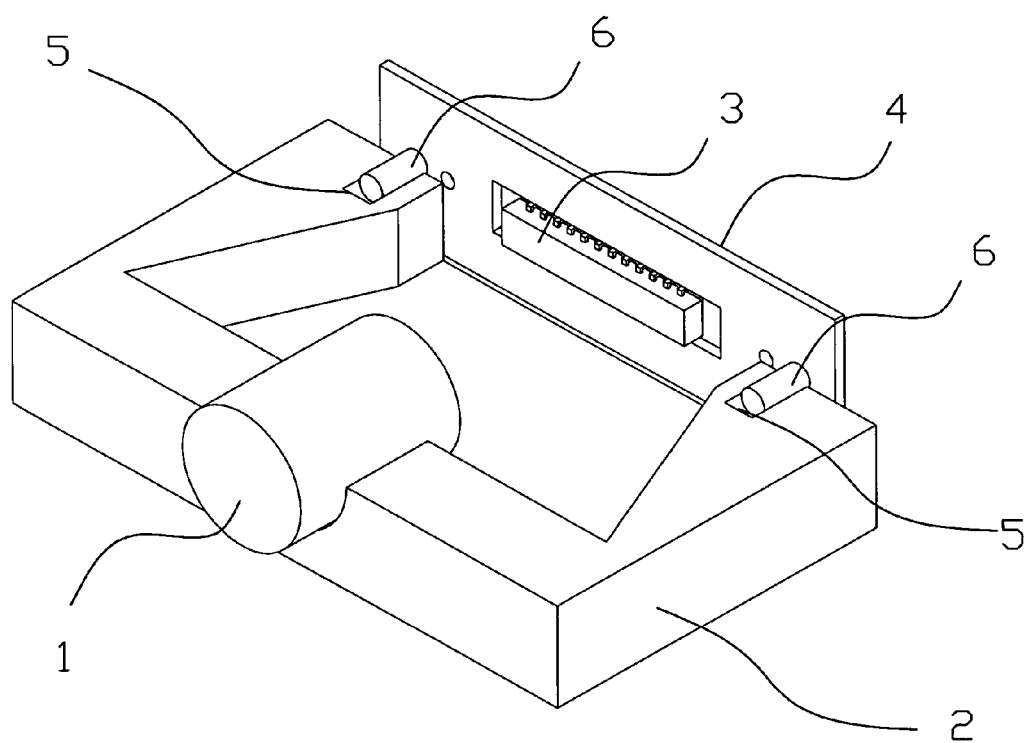
FIG. 1 is a schematic diagram depicting the carriage according to one embodiment of the present invention.
Figure 2:
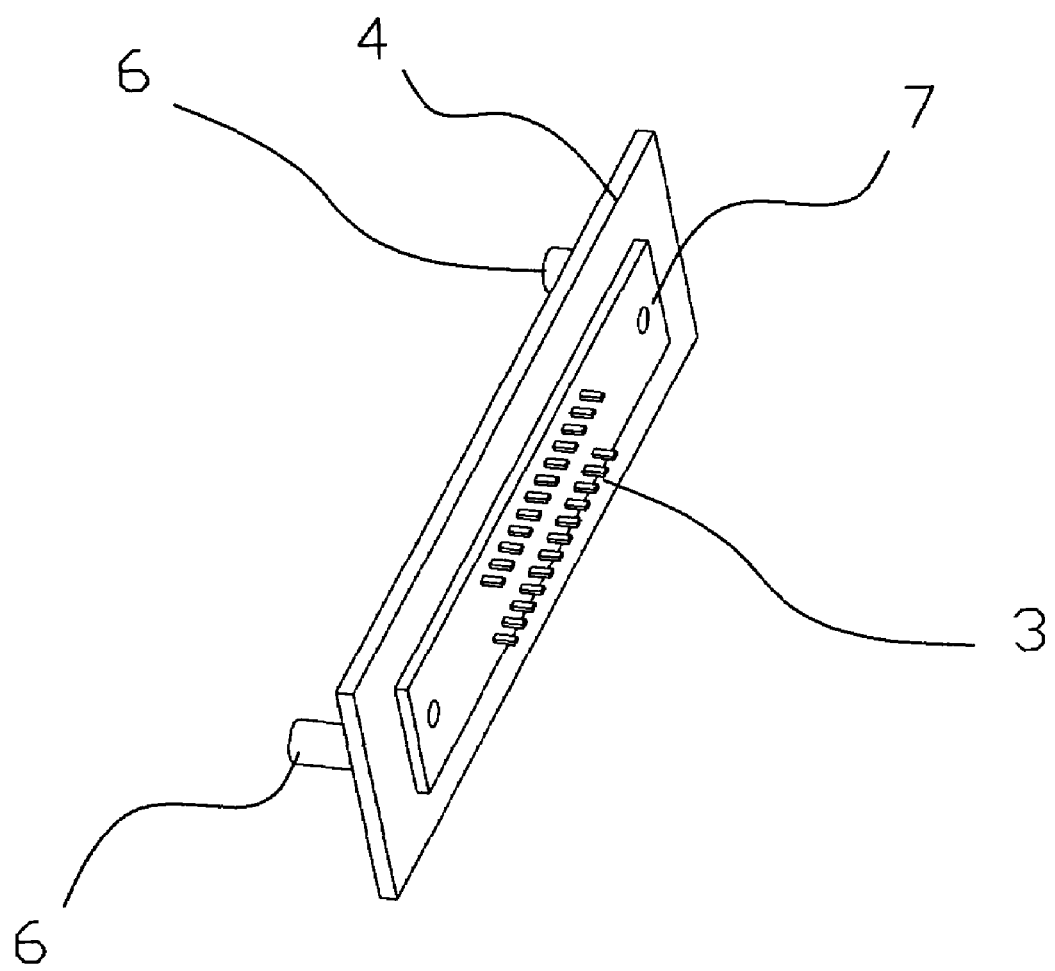
FIG. 2 is a schematic diagram depicting the support plate according to one embodiment of the present invention.

Referring to FIG. 1 and FIG. 2 are schematic diagrams illustrating the carriage and a schematic diagram depicting the support plate according to the present invention. As illustrated in these figures mentioned above, a lens 1 of carriage module to form the image to a charge coupled device (CCD) 3, the CCD 3 is soldered on a PC board 7 and the PC board 7 is mounted on a supporting plate 4, the supporting plate 4 connect to a sliding seat 5 which are formed on the carriage 2 by pins 6 which are fixed on both ends of the supporting plate 4. For adjusting the distance between the lens 1 and the CCD 3, the pins 6 may be movable forward and backward in the sliding seats 5. Although the CCD 3 is moved by the process of adjusting the distance between the lens and the CCD 3, the optical axis of the lens 1 and the CCD 3 is preferably kept parallel.

Figure 3:
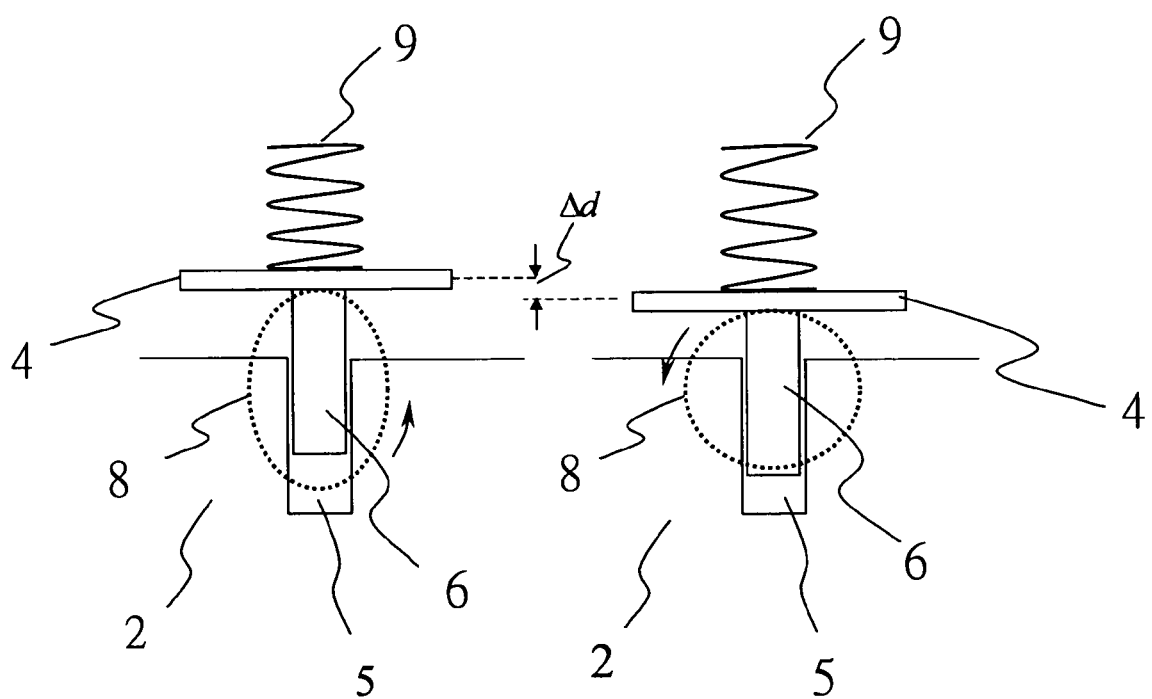
FIG. 3 is a schematic view of the cam and the spring transmission according to one embodiment of the present invention.

As shown in FIG. 3 is the movement of a cam 8 and the pins 6 as a follower moving in the sliding seats 5. When the cam 8 moves the pins 6 will move with the supporting plate 4 forward and backward, and the distance between the lens 1 and the image sensor (CCD) 3 will be adjusted. The cam 8 may be a rotational type or a translational type or other type that functions are approximate. A spring set 9 may be set on the cam 8 for providing restoring. The spring set 9 can be a spiral type or a reed type.

According to different kinds of the demand, the grasping device is desired for specially things, such as film, slide, etc., or the light source of different wavelength such as infrared ray (IR), etc., because of the physics limitation of formation the image of optics, the preferable position of lens to form the image is not the same to every application. It is unable to focus and to get the best quality of digital image for putting the film-grasping device on the glass platform of the scanner or using the infrared ray as the light source.

FIG. 1 and FIG. 3 illustrate the movement of the cam 8 and the pins 6 in a specific direction to move a small distance $\Delta d$ forward and backward. The distance between the lens 1 and the CCD 3 will be adjusted, and then the CCD 3 may capture the best digital image. Accordingly, it is not necessary to tune the lens or shift the object by hand for adjusting the distance between the lens and the CCD 3. So, the device in this invention not only improve the quality of the formation of image and also promote the efficiency of operating.

While this invention has thus far been described in connection with the preferred embodiments thereof, it will readily be possible for those skilled in the art to put this invention into practice in various other manners without departing from the scope set forth in the appended claims.

What is claimed is:

1. A carriage module with an image capture unit for use in a scanning device, said carriage module comprising:
 a carriage, having a sliding seat and a cam;
 a lens, attached to said carriage;
 a supporting plate comprising a pin disposed on a surface thereof and movably mounted on said sliding seat; and
 a PC board, comprising an image sensor, fixed on said supporting plate, wherein said pin of said supporting plate automatically moves on said sliding seat to adjust a distance between said lens and said image sensor for capturing a best-quality image of an object.

2. The carriage module according to claim 1, wherein said image sensor is a charge coupled device (CCD).

3. The carriage module according to claim 1, wherein said cam is a rotational type or a translational type.

4. The carriage module according to claim 1, wherein said cam further comprises a spring set.

5. The carriage module according to claim 4, wherein said spring set is a spiral type or a reed type.

6. The carnage module according to claim 1, wherein said image sensor is soldered on said PC board.

* * * * *

UNITED STATES PATENT AND TRADEMARK OFFICE
CERTIFICATE OF CORRECTION

PATENT NO. : 7,612,924 B2 Page 1 of 1
APPLICATION NO. : 11/269526
DATED : November 3, 2009
INVENTOR(S) : Harnjou Yeh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Nineteenth Day of October, 2010

David J. Kappos
*Director of the United States Patent and Trademark Office*